US012637348B2

(12) United States Patent
Esser et al.

(10) Patent No.: US 12,637,348 B2
(45) Date of Patent: May 26, 2026

(54) MONITORING REFUELING OPERATIONS

(71) Applicant: ryd GmbH, Munich (DE)

(72) Inventors: Klaus Esser, Munich (DE); Oliver Goetz, Gräfelfing (DE); Johannes Martens, Munich (DE)

(73) Assignee: ryd GmbH, Munich (DE)

(*) Notice: Subject to any disclaimer, the term of this patent is extended or adjusted under 35 U.S.C. 154(b) by 25 days.

(21) Appl. No.: 18/785,136

(22) Filed: Jul. 26, 2024

(65) Prior Publication Data

US 2025/0042715 A1 Feb. 6, 2025

(30) Foreign Application Priority Data

Aug. 1, 2023 (EP) .................................... 23189077

(51) Int. Cl.
*B67D 7/34* (2010.01)

(52) U.S. Cl.
CPC .................................... *B67D 7/348* (2013.01)

(58) Field of Classification Search
CPC .................................. B67D 7/348; B67D 7/04
See application file for complete search history.

(56) References Cited

U.S. PATENT DOCUMENTS 5,871,651 A * 2/1999 McSpadden ............. B67D 7/76 210/93
2009/0152346 A1 6/2009 Granruth et al.
2010/0332363 A1 12/2010 Duddle et al.
2014/0129426 A1 5/2014 Lamb et al.
2018/0072152 A1 * 3/2018 Dudar .................. B67D 7/0492

FOREIGN PATENT DOCUMENTS

WO 2008142423 11/2008

OTHER PUBLICATIONS

Extended European Search Report for European Patent Application No. 23 18 9077 dated Jan. 30, 2024 (8 pages).

* cited by examiner

*Primary Examiner* — Jason K Niesz
(74) *Attorney, Agent, or Firm* — Fox Rothschild LLP; Carol E. Thorstad-Forsyth

(57) ABSTRACT

A method for detecting fuel fraud when refueling a vehicle at a filling station comprises obtaining, in conjunction with a current refueling operation in which the vehicle is refueled at the filling station, current refueling information, determining if there is a mismatch between the obtained current refueling information and historical refueling information which is based on a plurality of past refueling operations in which comparable vehicles were refueled, and raising a potential fraud warning based at least in part on a determined mismatch. The current refueling information comprises at least: first information indicating a distance the vehicle traveled since at least a previous refueling operation, second information indicating a duration and/or progress of the current refueling operation, and third information indicating an amount of fuel dispensed by a fuel pump in the current refueling operation. One or more machine-readable media, a server installation and a system are adapted to perform corresponding operations or cause corresponding operations to be performed.

20 Claims, 2 Drawing Sheets

MONITORING REFUELING OPERATIONS

BENEFIT CLAIM

This application claims the benefit of priority to European Patent Application EP 23 189 077.3, titled "MONITORING REFUELING OPERATIONS, filed Aug. 1, 2023, the entire contents of which are hereby incorporated as if fully set forth herein for all purposes.

FIELD OF THE INVENTION

The present invention relates to the field of automotive fueling systems, and in particular to the field of monitoring refueling operations in order to detect potential fuel fraud.

BACKGROUND OF THE INVENTION

Many companies use payment systems to handle refueling of the companies' vehicles. Such payment systems are often said to use "fuel cards", no matter if a payment system actually uses physical cards (similar to credit cards) or other kinds of tokens, such as smartphones running particular apps. The general principle of fuel cards is that a company or other entity establishes an account at a payment system and then gives out fuel cards to its employees.

When an employee refuels a company vehicle at a filling station, the employee uses his or her fuel card to identify himself or herself as being authorized to buy fuel on behalf of the company. The fuel is then charged to the company's account.

The use of fuel cards and similar payment systems has advantages for all parties. The employee does not need to have access to any general payment means of the company. The company receives collected fueling and payment information for a potentially large number of refueling operations, and may further receive a discount. The operator of the payment system (which may be an oil company or a third party provider) enjoys increased customer loyalty and, in the case of a third party provider, receives a commission. Furthermore, the use of payment cards leads to quick and seamless refueling operations, which increase the throughout of a filling station, i.e., the number of refueling operations which can be performed for a given number of fuel pumps during a given time interval.

However, a well-known downside of the use of fuel cards and similar payment systems is that they may be susceptible to various kinds of fraud in which the fuel card is used to pay for fuel that is not used for the company's intended purposes. As a basic example, a company's fuel card could be used to pay for refueling a non-authorized vehicle, such as the employee's private car. This case may be relatively easy to detect. More sophisticated kinds of fraud are possible. For example, in the kind of fraud known as "skimming", the employee first puts some fuel into the company's vehicle and then fills a canister with fuel for the employee's private use. Similarly, the employee may correctly fill the company's vehicle during the filling operation, but later siphons off some of the fuel out of the tank for the employee's private use. As long as the employee does this with moderation, it may be difficult to discover that the total amount of fuel for which the company paid is less than the amount of fuel used for the company's intended purposes, especially if the employee further over-reports the number of kilometers or miles driven by the company vehicle (a practice known as "mileage creep") to compensate for the fuel that has been paid for by the company but used for other purposes.

US 2009/0152346 A1 discloses a fuel card monitoring system in which a vehicle comprises a mobile data unit including information gathering devices. The information gathering devices comprise a fuel meter that measures fuel as it is dispensed into the vehicle, and a distance measuring device for measuring the number of miles or kilometers driven by the vehicle. The total amount of fuel used over the course of a trip is compared against the measured distance of the trip, so that any discrepancies in fuel consumption can be picked up.

However, even though the application published as US 2009/0152346 A1 was filed more than 15 years ago, fuel fraud continues to exist. According to current estimates, fuel fraud when using fuel cards may be in the region of 10-20%. There is a need to provide improved detection mechanisms for fuel fraud.

OBJECTS AND SUMMARY

It is an object of the present invention to provide an improved, or at least an alternative, way of detecting fuel fraud when refueling a vehicle at a filling station.

The present invention is defined by the independent claims. The dependent claims concern optional features of some embodiments of the invention. Due account shall be taken of any element which is equivalent to an element specified in the claims.

The present invention is based on the finding that predefined fixed rules for comparing vehicle data with fuel usage data may not be sufficient to provide comprehensive fuel fraud detection. Indeed, even the seemingly simple task of determining a suitable rule for a specific kind of fuel fraud is difficult in practice, given the many different circumstances which need to be taken into account. The situation is even more difficult considering the possibility that new kinds of fuel fraud might emerge, which preferably should be detected at least with some likelihood.

The present invention therefore strives to avoid predefined fixed rules, either completely or at least in part. Instead of and/or in addition to such rules, the present invention determines if there is a mismatch between current refueling information for a current refueling operation of a particular vehicle and historical refueling information which is based on a plurality of past refueling operations in which comparable vehicles were refueled. This determination works because the majority of users do not commit any fraud, to that the historical refueling information can serve as a baseline for, or example pattern of, a non-fraudulent refueling operation.

According to the present invention, the determination of a possible fuel fraud is based on multiple different kinds of information. These kinds of information include at least first information indicating a distance the vehicle traveled since at least a previous refueling operation, second information indicating a duration and/or progress of the current refueling operation, and third information indicating an amount of fuel dispensed by a fuel pump in the current refueling operation. In some embodiments, further kinds of information are taken into account. Given that the present invention uses historical refueling information as a baseline, comparatively little effort is needed to expand the inventive fraud detection method so that it uses additional kinds of information. In many embodiments, it is therefore advisable to make use of as many different kinds of information as possible.

The order in which the operations and method steps are recited in the claims should not be construed as limiting, unless it is specified otherwise in the claims. It is apparent that many of these operations and method steps can be performed in a different order or wholly or partially parallel or wholly or partially interleaved with each other.

The machine-readable medium according to the present disclosure may comprise suitable program instructions to realize the recited operations, for example on a general-purpose computer, or on a device comprising a processor, or in a programmable integrated circuit. The machine-readable medium may be any kind of non-transitory data carrier like, for example, a hard disk, or an optical data carrier, or a semiconductor memory. The machine-readable medium may be a non-transitory and/or tangible data carrier.

BRIEF DESCRIPTION OF THE DRAWINGS

Further features, objects and advantages of the invention will become apparent from the following detailed description, in connection with the annexed schematic drawings, in which.

DETAILED DESCRIPTION OF EMBODIMENTS

Figure 1:
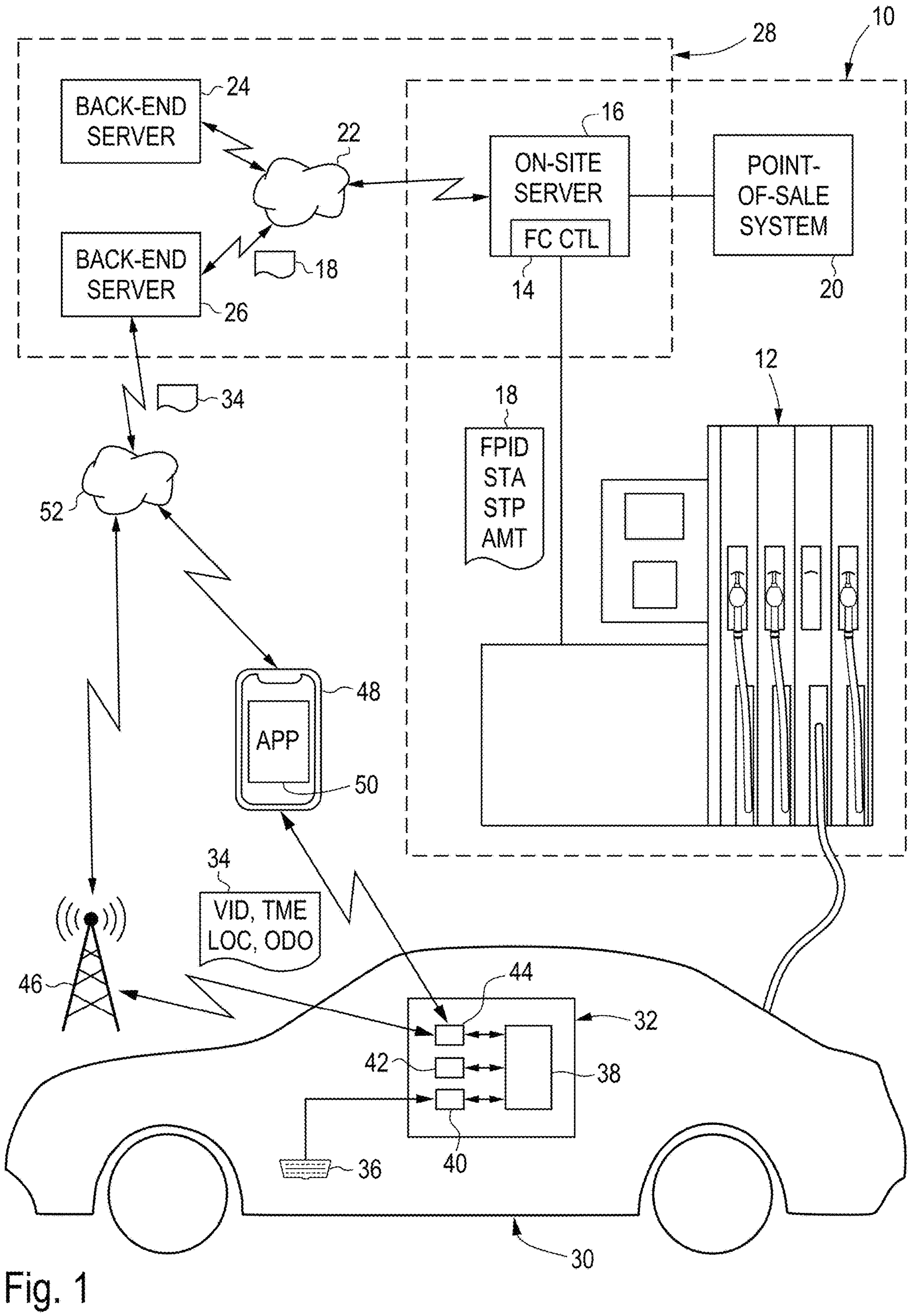
FIG. 1 shows a schematic representation of a filling station and a server installation with a vehicle during a refueling operation, according to embodiments of the present invention.

FIG. 1 shows elements of a filling station 10, which comprises at least one fuel pump 12. For the sake of clarity, FIG. 1 shows only a single fuel pump 12, but it is apparent that the present invention is not limited to any specific number of fuel pumps and that most filling stations 10 have multiple fuel pumps. Each fuel pump 12 of the filling station 10 is connected to, and communicates with, a forecourt controller 14, which may be a module of an on-site server 16 or a separate device in communication with the on-site server 16. In a manner known as such, the forecourt controller 14 acts as an interface for controlling operation of each fuel pump 12 and receiving various kinds of information from the fuel pump 12.

As a non-limiting example, FIG. 1 shows a fuel pump message 18 comprising an identification FPID of the fuel pump 12, start and stop times STA, STO of a filling operation, and an amount AMT of fuel dispensed by the fuel pump 12 during the filling operation. However, it is apparent that additional or fewer or different pieces of information can be contained in the fuel pump message 18 in different embodiments. For example, the fuel pump message 18 can additionally comprise an indication of the type of fuel used in the filling operation, such as the general kind of fuel (e.g., gasoline or diesel or hydrogen or liquified natural gas LNG), or the specific grade of fuel (e.g., normal or super or extra gasoline).

The on-site server 16 is further connected to a point-of-sale system 20, such as a cash register having a terminal for several kinds of card payments. Yet further, the on-site server 16 communicates, via any combination of wired and wireless networks 22, with one or more back-end servers 24, 26. The non-limiting example in FIG. 1 shows two back-end servers 24, 26, but it is apparent that any number of one or more back-end servers 24, 26 can be used. In the case of multiple back-end servers 24, 26, at least some of them may be operated at different locations and/or by different entities. For example, a first back-end server 24 may be associated with a manufacturer of a vehicle to provide information about the operational status of the vehicle (such as a current location or a current odometer value indicating a number of kilometers or miles driven), and a second back-end server 26 may be operated by a company managing a fuel card payment system.

Generally speaking, the distribution of functions between the on-site server 16 and the one or more back-end servers 24, 26, and likewise the distribution of functions between multiple back-end servers 24, 26, may be chosen according to technical and/or administrative and/or legal requirements. The present invention is not limited to any particular distribution of these functions, unless specified otherwise in the claims. The totality of the servers performing the functions of the present invention, which may include the on-site server 16 and/or the one or more back-end servers 24, 26, is referred to as a server installation 28 in the present document.

FIG. 1 further shows a vehicle 30 currently being refueled at the filling station 10. The vehicle 10 may be any kind of private or commercial vehicle, such as a car or a bus or a truck. The vehicle 30 comprises an on-board unit 32 which provides, to the server installation 28, various kinds of information regarding the operational status and/or location of the vehicle 30. This information may be sent in the form of a vehicle message 34, which will be further explained below.

In the example shown in FIG. 1, the on-board unit 32 is configured as a compact hardware device ("dongle") plugged into a control or diagnosis port 36 of the vehicle 30, such as an OBD, OBD2, or EOBD port. The on-board unit 32 comprises a control unit 38 including the usual elements of an embedded computer, an interface unit 40 connected to the port 36, a location determining unit 42, and a wireless communication unit 44. In many embodiments, the location determining unit 42 determines the current location of the vehicle 30 from signals of a global navigation satellite system (GNSS), such as one of the systems commonly known as GPS or GLONASS or Galileo or BeiDou. However, embodiments are also envisaged in which the on-board unit 32 or a device interfacing with the on-board unit 32 determines an approximate location of the vehicle 30 using cell data of a cellular communication network such as, for example, a 4G or 5G or higher network.

In some embodiments, the wireless communication unit 44 may be adapted for wide-range wireless communication via a mobile telecommunication network, which is represented by a cellular base station 46 in FIG. 1. Alternatively or cumulatively, the wireless communication unit 44 may be adapted for short-range wireless communication via a communication protocol such as Bluetooth™. FIG. 1 shows a mobile device 48 (such as a smartphone or a smartwatch of a driver of the vehicle 30 or a passenger) as a station in the short-range communication where an application ("app") 50 executing on the mobile device 48 receives the vehicle message 34. The vehicle message 34 is then communicated to the server installation 28 via one or more networks 52 interfacing with the cellular base station 46 and/or the mobile device 48.

The example embodiments described so far use a dedicated device which is not part of the factory configuration of the vehicle 30 as the on-board unit 32. However, the on-board unit 32 may generally be any unit comprising hardware and/or software. The on-board unit 32 may be factory-installed or retrofitted, and it may be removable or permanently installed. To provide a further example, the on-board unit 32 may be a software component operating in a computer unit of the vehicle 30, wherein the computer unit may be part of a control system or an entertainment system or a navigation system or a user interface system of the vehicle 30. As yet another example, the on-board unit 32 may be a software program ("app") executed by a mobile device (such as a mobile telephone or a smartphone or a smartwatch) of a driver of the vehicle 30 or a passenger.

In operation, the on-board unit 32 communicates and interacts with further components of or located within the vehicle 30. For example, in embodiments in which the on-board unit 32 is not equipped to perform wide-range wireless communications on its own, the on-board unit 32 may interact with a mobile device (such as a smartphone or a similar device) of a driver of the vehicle 30 or a passenger to send vehicle messages 34 to a cellular network. Conversely, in embodiments in which the on-board unit 32 is implemented on a mobile device separate from the vehicle 30, the on-board unit 32 may communicate with elements of the vehicle 30, such as a vehicle control system.

As already indicated, the vehicle message 34 contains various pieces of information regarding the vehicle 30 and its operational status. As a non-limiting example, the vehicle message 34 may contain a vehicle identification VID, a time stamp TME, location information LOC indicating the present location of the vehicle 30 in the form of geographic coordinates, and odometer information ODO indicating the mileage (expressed in kilometers or miles or any other unit) driven by the vehicle 30 since a predefined starting point. This starting point will usually be the time the vehicle 30 was manufactured, but any other starting point (including the time of the most recent previous refueling operation, if this information is available at the on-board unit 32) may be used.

In many embodiments, further information about the vehicle 30 is provided in the vehicle message 34, such as, without limitation, an indication of the approximate amount of fuel in the tank (e.g., 30 liters), or an indication of a degree to which the tank is full (e.g., 50% full), or at least an indication whether the fuel level has recently increased. It is apparent that further or different or fewer pieces of information may be present in other embodiments. The vehicle message 34 may be sent at predefined time intervals (e.g., every minute), or after travelling a predefined distance (e.g., every kilometer travelled), or whenever an "interesting" event is detected at the vehicle 30 (e.g., at the start of a new trip).

The server installation 28 is aware of the identity of the vehicle 30 and/or its driver and/or a passenger. In the example described above, the vehicle identification VID contained in the vehicle message 34 may identify one or more of the on-board unit 32 (e.g., a serial number of the on-board unit 32), the vehicle 30 (e.g., a vehicle identification number VIN of the vehicle 30), or a person associated with the vehicle 30 (e.g., a person who has registered to use the application 50).

Upon completion of a refilling operation, the fuel pump 12 generates the fuel pump message 18 and sends it to the forecourt controller 14. The forecourt controller 14 and/or the on-site server 16 forward the fuel pump message 18, or at least some of the information contained therein, to a suitable back-end server 24, 26 for further processing. It is an added security feature in many embodiments that this forwarding operation does not involve any human interaction. In particular, embodiments are preferred in which no human operator at the point-of-sale system 20 manually enters any transaction information relevant to fraud detection. This measure avoids potential fraud through a possible manipulation of transactions closed at the point-of-sale system 20 by a cashier.

Figure 2:
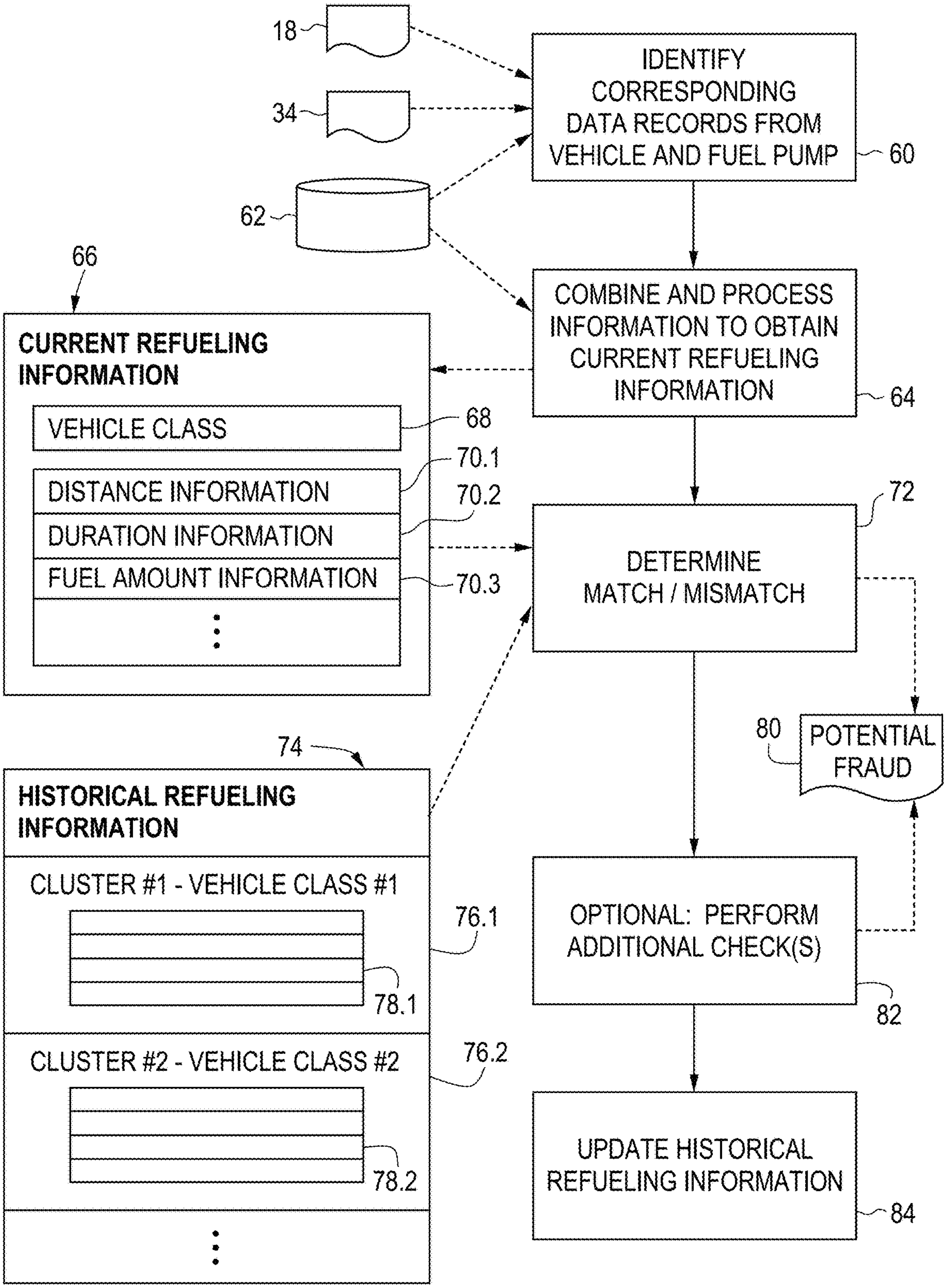
FIG. 2 shows a schematic flow diagram of operations and data according to embodiments of the present invention.

FIG. 2 shows an example process and data flow diagram with operations that are primarily performed by the server installation 28, based on information received from the filling station 10, the on-board unit 32, and/or further devices such as the mobile device 48. The overall process is intended to detect a possible occurrence of fuel fraud when the vehicle 30 is refueled at the filling station 10.

In step 60, the server installation 28 identifies corresponding data records from the vehicle 30 and the fuel pump 12 about a particular refueling operation. In the presently described example, this may include identifying a fuel pump message 18 and a vehicle message 34 which pertain to one and the same refueling operation. For example, this may be done by comparing the start and stop times STA, STP in the fuel pump message 18 with the time stamp TME in the vehicle message 34. Alternatively or additionally, it may be determined if the location information LOC in the vehicle message 34 matches a known location of the fuel pump 12, which may be determined from an entry in a database 62 based on the identification FPID of the fuel pump 12 in the fuel pump message 18. The database 62 may contain all kinds of information facilitating the process shown in FIG. 2, including, but not limited to, knowledge about the geographical positions of certain entities (such as the fuel pump 12), knowledge about general properties of the vehicle 30 (such as a general class or type associated with the vehicle 30), and specific information about the vehicle 30 (such as the odometer reading at the time of the most recent refueling operation).

In step 64, the server installation 28 combines and processes the information about a single refueling operation to generate a data structure comprising current refueling information 66.

As a non-limiting example, the data structure contains an indication 68 of the category or class of the currently refueled vehicle and multiple further pieces of information 70.1, 70.2, 70.3, . . . , which pertain to characteristics of the current refueling operation that may be pertinent for detecting fuel fraud. These pieces of information 70.1, 70.2, 70.3, . . . , which will also be designated by the summarizing reference sign 70.*x* in the present document.

The vehicle class indication 68 indicates a category or class or type of the vehicle 30. In many embodiments, this is not a specific indication of the vehicle make, model and year, but rather an indication which distinguishes different vehicles having different refueling properties while clustering vehicles having similar refueling properties. For example, the vehicle class indication 68 distinguishes vehicles based on their expected fuel consumption, so that more economical vehicles will generally be placed in a different class than less economical vehicles. The vehicle class indication 68 may be determined from the vehicle identification VID in the vehicle message 34, using information from the database 62 which maps vehicle identifications VID to corresponding vehicle class indications 68. An automated clustering method may be used to initially determine a suitable set of possible vehicle class indications and the assignment of each particular vehicle make, model and year to one of these class indications.

In the presently described embodiment, the further pieces of information 70.*x* comprise first information 70.1 which indicates a distance the vehicle 30 was driven since at least a previous refueling operation, second information 70.2 which indicates a duration and/or progress of the current refueling operation, and third information 70.3 which indicates an amount of fuel dispensed by the fuel pump 12 in the current refueling operation. Again, it is apparent that additional pieces of information 70.*x* can be used in further embodiments, and it is in fact believed to be advantageous to make use of as many pieces of information 70.*x* as possible, based on the information provided in the fuel pump message 18 and the vehicle message 34. As a non-limiting example, information about the filling status of the vehicle 30, as determined by the in-board unit 32 and communicated in the vehicle message 34, may be used as an additional piece of information. As another example, information about the fuel type used in the current refueling operation (e.g., the general kind of fuel and/or specific grade of fuel), as communicated in the fuel pump message 18, may also be used as an additional piece of information.

The distance indicated in the first information 70.1 may be, as a non-limiting example, the number of kilometers or miles since the most recent refueling operation. In the presently described embodiment, this distance is calculated based on the odometer information ODO contained in at least two vehicle messages 34, namely a current vehicle message 34 and at least one historical vehicle message 34 sent at the time of the most recent refueling operation. The odometer readings accessed by the on-board unit 32 are usually quite accurate in a modern vehicle 30.

In embodiments in which the vehicle messages 34 contain a different kind of distance measures, such as the distance driven since the last engine start, then it may be necessary for the server installation 28 to sum up distance measures from several vehicle messages 34 to obtain the first information 70.1. Any required historical information is stored in the database 62 for use by the server installation 28. In yet further embodiments, the server installation 28 determines the distance indicated in the first information 70.1 not or not exclusively from odometer readings of the vehicle 30, but using location information, such as the location information LOC in the vehicle messages 34, or any other kind of suitable information such as GNSS trip data.

The second information 70.2 may, in some embodiments, be based on the start and stop times STA, STP in the fuel pump message 18. In the absence of fraud, the total duration of the filling operation is well correlated with the amount of fuel dispensed in a refueling operation. If the refueling operation takes longer than expected, then this may point to an interruption of the refueling operation, for example because the customer has interrupted the refueling operation by moving the fuel pump nozzle from a filler neck of the vehicle 30 to a separate canister. In some embodiments, the fuel pump message 18 comprises more detailed information about the refueling operation than just its start and stop times. For example, the fuel pump message 18 may contain a plurality of readings at different times during the refueling operation. Each reading may indicate one or more of a current fuel flow rate, an amount of fuel dispensed since the start of the refueling operation, and/or an amount of fuel disposed since a previous reading. This information describes the progress of the refueling operation in more detail and can be used, for example, to distinguish between a non-fraudulent instance of topping up towards the end of the refueling operation and a fraudulent instance of skimming in the middle of the refueling operation.

The third information 70.3, namely the amount of fuel dispensed by the fuel pump 12 in the current refueling operation, may be expressed in any suitable units, such as liters or gallons. This information is obtained by a calibrated device of the fuel pump 12, as communicated in the fuel pump message 18.

In step 72, the server installation 28 determines if there is a mismatch between the current refueling information 66 and historical refueling information 74. Historical refueling information 74 serves as a baseline and is assumed to correspond to non-fraudulent refueling operations. This assumption is viable because the majority of users are honest, so that the historical refueling information 74, which is derived from past refueling operations of many different users, on average corresponds to non-fraudulent operations.

The historical refueling information 74 is classified into a plurality of clusters 76.1, 76.2, . . . , which will also be designated as clusters 76.*x* in the present document. Each of the clusters 76.*x* corresponds to a particular vehicle class, using the same classification as used for the vehicle class information 68. As discussed above, the clustering distinguishes between vehicles that are associated with, on average, markedly different refueling operations, while keeping vehicles which can be expected to have similar refueling operations in a single cluster 76.*x*.

The clusters 76.*x* comprise information which is gathered from past refueling operations and which comprises similar kinds of data as described above for the current refueling operation 66. However, the information in the clusters 76.*x* is normalized to the extent possible, for example expressed relative to a certain distance driven and/or relative to a certain amount of fuel consumed. For example, in the presently described embodiment the first cluster 76.1 comprises information 78.1 which pertains to a first vehicle class and expresses at least (i) an expected amount of fuel for each kilometer driven since the last refueling operation, and (ii) an expected duration of a refueling operation for each expected liter of fuel. Similarly, the second cluster 76.2 comprises information 78.2 which pertains to a second vehicle class and expresses at least the same pieces of information (i) and (ii) for the second vehicle class. In the present document, the reference sign 78.*x* will be used to summarily refer to all pieces of information 78.1, 78.2, . . . , in the respective clusters 76.1, 76.2, . . . of the historical refueling information 74.

In different embodiments, the determination in step 72 may be performed in different ways. A first example embodiment first determines the pertinent cluster 76.*x* of the historical refueling information 74 for the class of the vehicle 30 involved in the current refueling operation. Then, expected values for the data expressed in at least some of the pieces of information 70.*x* are calculated from the normalized information in the pertinent cluster 76.*x*. In the presently described example, given a certain distance traveled by the vehicle 30, as indicated in the first information 70.1 of the current refueling information 66, an expected amount of fuel and an expected duration of the refueling operation are determined from the information in the pertinent cluster 76.*x*. The expected amount of fuel is then compared to the actual amount of fuel dispensed according to the third information 70.3, and the expected duration is compared to the actual duration of the refueling operation according to the second information 70.2. The server installation 28 generates and outputs a warning message 80 of potential fuel fraud if the actual amount of fuel exceeds the expected amount of fuel by a first threshold, and/or if the actual duration of the refueling operation exceeds the expected duration by a second threshold.

It may be feasible in the presently described embodiment to use predetermined first and/or second thresholds, which may be expressed either as absolute differences or as percentage differences. For example, the warning message 80 may indicate a difference of more than 10% between the expected and the actual duration. However, in some embodiments dynamically variable thresholds are used, which have the advantage that they are not based on fixed assumptions about possible fraud scenarios and are automatically adapted to changed techniques of fraud. For example, one, some or all of the thresholds may be automatically adjusted so that, on average, about 5% (or any other percentage) of refueling operations are flagged as potentially fraudulent.

A further example embodiment implements step 72 not by performing an item-for-item comparison, but rather by using a trained machine learning model to make the determination in step 72. The machine learning model is trained using the historical refueling information 74 and may be re-trained at appropriate times, as the historical refueling information 74 evolves. Any kind of artificial intelligence and machine learning techniques can be used to implement the machine learning model, including, but not limited to, neural networks, genetic algorithms, support vector machines, k-means, kernel regression and discriminant analysis.

In embodiments in which the fuel type is included in the current refueling information 66 and/or the historical refueling information 74, the fuel type may be taken into account when determining the expected amount of fuel used, as a factor for scaling the fuel amount information 70.3, or as an additional piece of information to be evaluated in step 72.

As an optional step 82, the server installation 28 performs one or more additional checks and verifications to cover further possible scenarios of fuel fraud. For example, in embodiments in which the vehicle message 34 is sent on a regular basis and comprises an indication of the current fuel level and ignition information, it can be verified that the fuel level does not drop between the time the ignition is switched off and the time the ignition is next switched on.

Any such drop might point to a possible siphoning off of fuel, which will be reported as a potential fraud instance in step 82. Further optional checks which may be performed by the server installation 28 in optional step 82 include one or more of the following:

Determine if the amount of fuel AMT as indicated by the fuel pump 12 in the fuel pump message 18 matches an increase in fuel level as indicated by a fuel level sensor of the vehicle 30.

Determine if the location LOC of the vehicle 30 at a certain time as indicated in the vehicle message 34 matches the time of the refueling operation and the location of the fuel pump 12.

Determine if the identification VID of the vehicle 30 as indicated in the vehicle message 34 corresponds to a vehicle registered for use of the fuel card service.

Finally, in step 84, the server installation 28 updates the historical refueling information 74 based on the current refueling operation and the current refueling information 66. Step 84 does not necessarily need to be performed for each individual refueling operation. Instead, it may be more efficient to collect the required information about a number of refueling operations and then update the historical refueling information 74 by the server installation 28 in one combined batch process, for example at a time of low system load. Any required information in the database 62, such as the odometer reading of the vehicle 30 at the time of refueling, is also updated.

The particulars contained in the above description of sample embodiments should not be construed as limitations of the scope of the invention, but rather as exemplifications of some embodiments thereof. Many variations are possible and are immediately apparent to persons skilled in the arts. In particular, this concerns variations that comprise a combination of features disclosed in the present specification. Accordingly, the scope of the invention should be determined not by the embodiments illustrated, but by the appended claims and their legal equivalents.

LIST OF REFERENCE SIGNS

10 filling station
12 fuel pump
14 forecourt controller
16 on-site server
18 fuel pump message
20 point-of-sale system
22 network
24 first back-end server
26 second back-end server
28 server installation
30 vehicle
32 on-board unit
34 vehicle message
36 port
38 control unit
40 interface unit
42 location determining unit
44 wireless communication unit
46 cellular base station
48 mobile device
50 application
52 network
60 identifying step
62 database
64 combining step
66 current refueling information
68 vehicle model indication
70.*x* pieces of information
72 match determination step
74 historical refueling information
76.*x* cluster
78.*x* pieces of information
80 warning message
82 optional checking step(s)
84 update step
FPID identification of fuel pump
STA, STP start and stop times of filling operation
AMT amount of fuel dispensed by fuel pump
VID vehicle identification
TME time stamp
LOC location information
ODO odometer information

We claim:

1. A computer-implemented method executed by one or more servers for detecting fuel fraud when refueling a vehicle at a filling station, the method comprising:

obtaining, in conjunction with a current refueling operation in which the vehicle is refueled at the filling station, current refueling information which comprises at least:

first information indicating a distance the vehicle traveled since at least a previous refueling operation, second information indicating at a duration and/or progress of the current refueling operation, and third information indicating an amount of fuel dispensed by a fuel pump in the current refueling operation;

determining if there is a mismatch between the obtained current refueling information and historical refueling information which is based on a plurality of past refueling operations, performed by multiple different persons, in which comparable vehicles were refueled; and raising a potential fraud warning based at least in part on a determined mismatch.

2. The method of claim 1, wherein the first information is based on one or more mileage or odometer indications received from the vehicle.

3. The method of claim 1, wherein the second information indicates at least a duration between a start event of the current refueling operation and an end event of the current refueling operation.

4. The method of claim 1, wherein the second information indicates at least a plurality of fuel flow rates or dispensed fuel amounts at a plurality of times during the current refueling operation.

5. The method of claim 1, wherein the third information is obtained from a forecourt controller of the filling station.

6. The method of claim 1, wherein the third information is obtained without human intervention.

7. The method of claim 1, wherein said current refueling information further comprises at least one of:

a fuel type used in the current refueling operation, an indication of a vehicle class of the vehicle, or a vehicle identification of the vehicle.

8. The method of claim 1, wherein said determining if there is a mismatch involves comparing the current refueling information to the historical refueling information using dynamically variable thresholds.

9. The method of claim 1, wherein said determining if there is a mismatch involves processing the current refueling information by a trained model, the model having been trained based on the historical refueling information.

10. The method of claim 1, wherein the historical refueling information is classified into a plurality of clusters of historical refueling information, each of the clusters relating to a particular vehicle class.

11. The method of claim 1, wherein said raising a potential fraud warning further involves:

comparing a location of the vehicle during the current refueling information with a location of the fuel pump.

12. The method of claim 1, wherein said raising a potential fraud warning further involves comparing an amount of fuel dispensed by the fuel pump in the current refueling operation with an amount of fuel determined from a fuel level indication provided by the vehicle.

13. A machine-readable medium or multiple machine-readable media having program instructions stored thereon, wherein the program instructions are adapted to cause one or more one or more servers, when executing the program instructions, to perform operations which comprise:

obtaining, in conjunction with a current refueling operation in which the vehicle is refueled at the filling station, current refueling information which comprises at least:

first information indicating a distance the vehicle traveled since at least a previous refueling operation, second information indicating a duration and/or progress of the current refueling operation, and third information indicating an amount of fuel dispensed by a fuel pump in the current refueling operation;

determining if there is a mismatch between the obtained current refueling information and historical refueling information which is based on a plurality of past refueling operations, performed by multiple different persons, in which comparable vehicles were refueled; and raising a potential fraud warning based at least in part on a determined mismatch.

14. The machine-readable medium of claim 13, wherein the first information is based on one or more mileage or odometer indications received from the vehicle.

15. The machine-readable medium of claim 13, wherein the second information indicates at least one of (i) a duration between a start event of the current refueling operation and an end event of the current refueling operation, or (ii) a plurality of fuel flow rates or dispensed fuel amounts at a plurality of times during the current refueling operation.

16. The machine-readable medium of claim 13, wherein said current refueling information further comprises at least one of:

a fuel type used in the current refueling operation, an indication of a vehicle class of the vehicle (30), or a vehicle identification of the vehicle.

17. A system comprising one or more servers, wherein the system is adapted to perform operations which comprise:

obtaining, in conjunction with a current refueling operation in which the vehicle is refueled at the filling station, current refueling information which comprises at least:

first information indicating a distance the vehicle traveled since at least a previous refueling operation, second information indicating a duration and/or progress of the current refueling operation, and third information indicating an amount of fuel dispensed by a fuel pump in the current refueling operation;

determining if there is a mismatch between the obtained current refueling information and historical refueling information which is based on a plurality of past refueling operations, performed by multiple different persons, in which comparable vehicles were refueled; and raising a potential fraud warning based at least in part on a determined mismatch.

18. The system of claim 17, further comprising at least one filling station.

19. The system of claim 17, wherein the first information is based on one or more mileage or odometer indications received from the vehicle.

20. The system of claim 17, wherein the second information indicates at least one of (i) a duration between a start event of the current refueling operation and an end event of the current refueling operation, or (ii) a plurality of fuel flow rates or dispensed fuel amounts at a plurality of times during the current refueling operation.

* * * * *